United States Patent
Alobaidi et al.

(10) Patent No.: US 11,437,661 B1
(45) Date of Patent: Sep. 6, 2022

(54) THERMAL SENSOR FOR A BATTERY

(71) Applicants: Mohammed Alobaidi, Kokomo, IN (US); Vijayendra Jannu, Bangalore (IN); Vasanth Mithilacody, Banglaore (IN)

(72) Inventors: Mohammed Alobaidi, Kokomo, IN (US); Vijayendra Jannu, Bangalore (IN); Vasanth Mithilacody, Banglaore (IN)

(73) Assignee: Green Cubes Technology, LLC, Kokomo, IN (US)

( * ) Notice: Subject to any disclaimer, the term of this patent is extended or adjusted under 35 U.S.C. 154(b) by 149 days.

(21) Appl. No.: 16/596,728

(22) Filed: Oct. 8, 2019

Related U.S. Application Data

(60) Provisional application No. 62/742,570, filed on Oct. 8, 2018.

(51) Int. Cl.
| | | |
|---|---|---|
| *H01M 10/44* | (2006.01) | |
| *H01M 10/48* | (2006.01) | |
| *H01M 10/42* | (2006.01) | |
| *H01M 10/6572* | (2014.01) | |

(52) U.S. Cl.
CPC ..... *H01M 10/486* (2013.01); *H01M 10/4257* (2013.01); *H01M 10/6572* (2015.04); *H01M 2010/4278* (2013.01)

(58) Field of Classification Search
CPC .. H01M 10/486; H01M 10/482; H01M 10/48; H01M 10/6572; H01M 10/6571; H01M 10/4257; H01M 10/425; H01M 2010/4278
See application file for complete search history.

(56) References Cited

U.S. PATENT DOCUMENTS 10,862,323 B2 * 12/2020 Banos ................ H01M 10/425

* cited by examiner

*Primary Examiner* — Raymond Alejandro
(74) *Attorney, Agent, or Firm* — Reichel Stohry Dean LLP; Mark C. Reichel; Natalie J. Dean

(57) ABSTRACT

Thermal sensor for a battery. In an exemplary embodiment of a battery docking connector of the present disclosure, the connector comprises exposed battery contacts, and a circuit sensor electrically coupled to the exposed battery contacts for sensing the temperature at the exposed battery contacts, wherein the circuit sensor is configured to switch off an electrical load coupled thereto once a threshold temperature has been reached, to prevent overheating of a battery providing power to the electrical load.

9 Claims, 5 Drawing Sheets

THERMAL SENSOR FOR A BATTERY

PRIORITY & RELATED APPLICATION

The present application is related to, and claims the priority benefit of, U.S. Provisional Patent Application Ser. No. 62/742,570, filed Oct. 8, 2018, the contents of which are incorporated into the present disclosure in their entirety.

BACKGROUND

When batteries are swapped there is a potential for the battery to be improperly placed and/or for dirt or liquids to obstruct the exposed battery connection contacts. When the battery is improperly positioned and/or when the exposed battery connection contacts become obstructed, the battery may overheat and eventually destroy the battery and/or the battery connection system. Thus, it would be desirable to sense or monitor the temperature of the exposed battery connection contacts to shut the system down should the temperature rise too high, thus saving the battery and/or battery connection system.

BRIEF SUMMARY

In at least one exemplary embodiment of a battery docking connector of the present disclosure, the connector comprises exposed battery contacts, and a circuit sensor electrically coupled to the exposed battery contacts for sensing the temperature at the exposed battery contacts, wherein the circuit sensor is configured to switch off an electrical load coupled thereto once a threshold temperature has been reached, to prevent overheating of a battery providing power to the electrical load.

In at least one exemplary embodiment of a battery docking connector of the present disclosure, wherein the circuit sensor comprises a thermal sensor.

In at least one exemplary embodiment of a battery docking connector of the present disclosure, the circuit sensor comprises a thermistor.

In at least one exemplary embodiment of a battery docking connector of the present disclosure, the circuit sensor comprises a thermocouple.

In at least one exemplary embodiment of a battery docking connector of the present disclosure, rein the circuit sensor and the exposed battery contacts are electrically coupled to a printed circuit board within the battery docking connector.

In at least one exemplary embodiment of a method for switching off an electrical load to a battery to prevent overheating of the present disclosure, the method comprises inserting a battery into proper alignment with a battery docking connector, electrically coupling exposed battery contacts of the battery with exposed battery contacts of the battery docking connector, sensing the temperature at the exposed battery contacts on the battery docking connector, and switching off an electrical load at the exposed battery contacts on the battery docking connector if the temperature sensed exceeds a predetermined threshold temperature.

In at least one exemplary embodiment of a method for switching off an electrical load to a battery to prevent overheating of the present disclosure, sensing the temperature further comprises operating a circuit sensor.

In at least one exemplary embodiment of a method for switching off an electrical load to a battery to prevent overheating of the present disclosure, the circuit sensor and exposed battery connection contacts are electrically coupled to a printed circuit board positioned within the battery docking connector.

In at least one exemplary embodiment of a method for switching off an electrical load to a battery to prevent overheating of the present disclosure, the method further comprises sending an error or alert message to a user regarding the temperature.

In at least one exemplary embodiment of a temperature sensing system for battery docking connector of the present disclosure, the system comprises a microcontroller, a step down controller, and a battery each electrically coupled together, a circuit sensor electrically coupled to the battery for sensing the temperature at the battery, wherein the microcontroller reduces battery charging current if the sensed temperature crosses a first predetermined threshold temperature, and wherein the microcontroller turns off the battery charging current if the sensed temperature crosses a second predetermined threshold temperature to prevent overheating.

In at least one exemplary embodiment of a temperature sensing system for battery docking connector of the present disclosure, the microcontroller reduces battery charging current via the step down controller if the sensed temperature crosses a first predetermined threshold temperature.

In at least one exemplary embodiment of a temperature sensing system for battery docking connector of the present disclosure, the microcontroller further comprises a Digital to Analog Converter (DAC) Pin, and wherein the DAC Pin is used to set analog voltage to control battery current levels.

In at least one exemplary embodiment of a temperature sensing system for battery docking connector of the present disclosure, the step down controller further comprises a CTRL Pin, and wherein battery charging current is set by analog voltage on the CTRL Pin.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 2:
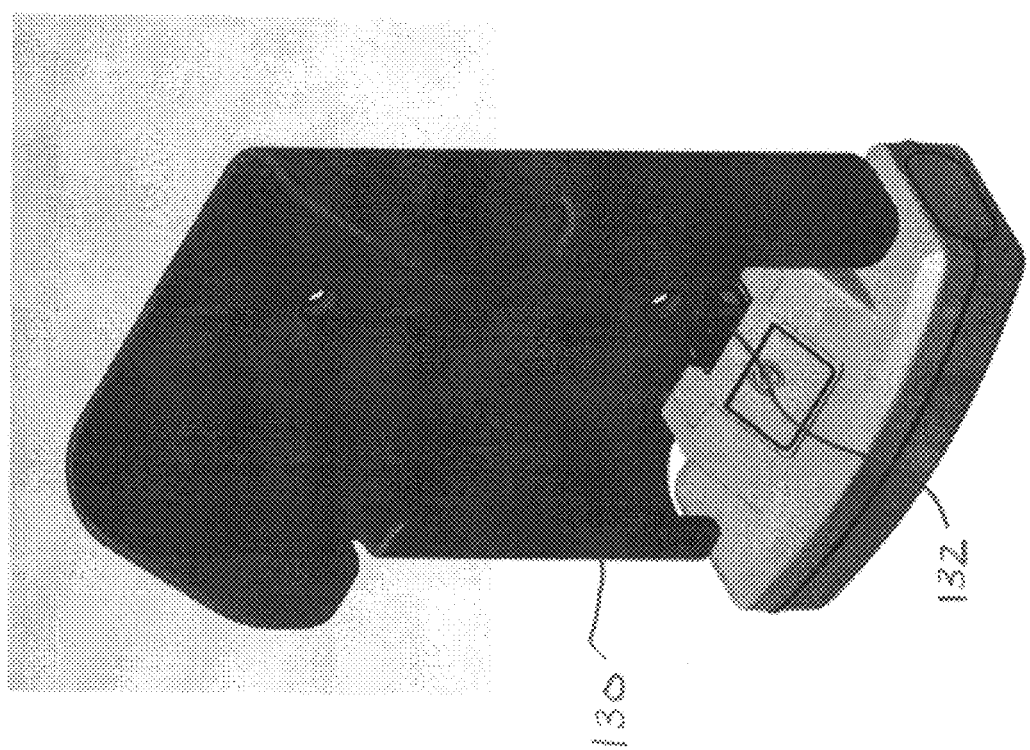
FIG. 2 illustrates an exemplary battery docking connector with exposed battery connection contacts thereon.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes various battery connection contacts within exemplary battery docking connectors for receiving removable mobile batteries therein, as well as systems, and methods for swapping the battery in a battery docking connector.

Figure 1:
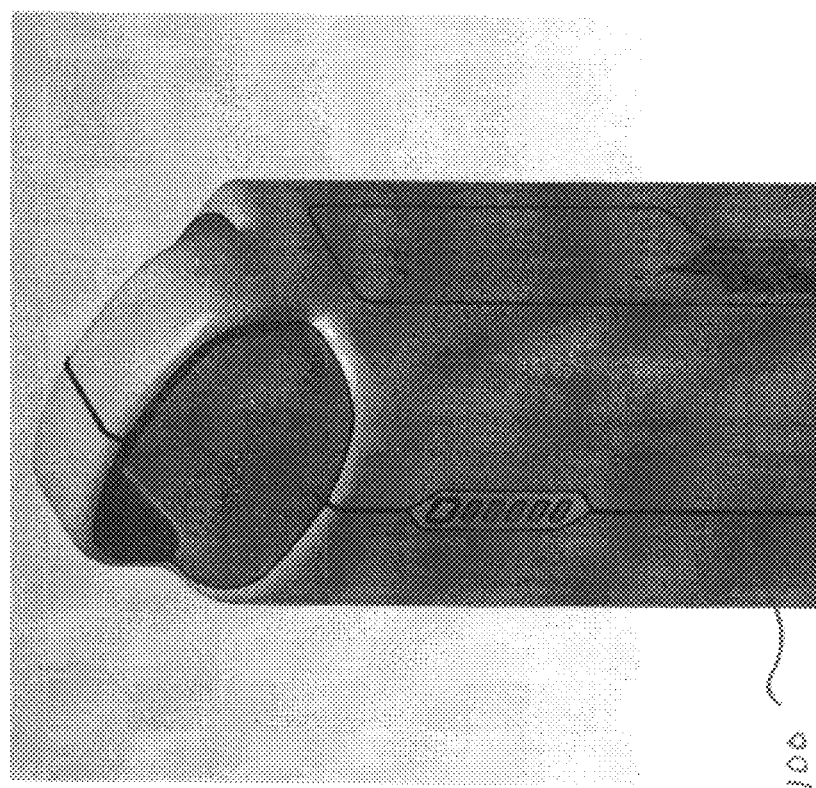
FIG. 1 illustrates an exemplary battery.

In a first embodiment, an exemplary battery 100 is shown in FIG. 1. FIG. 2 illustrates an exemplary battery docking/connector 130 without a battery 100 coupled thereto to help illustrate the exposed battery connection contact 132 thereon. It should be understood that any size, shape, and type of battery 100, battery docking/connector 130, and battery connection contacts 132 may be used herein. In one exemplary embodiment, the exposed battery connection contacts 132 and battery docking/connector 130 may be found within the battery guide in the base of a mobile powered workstation.

Figure 4:
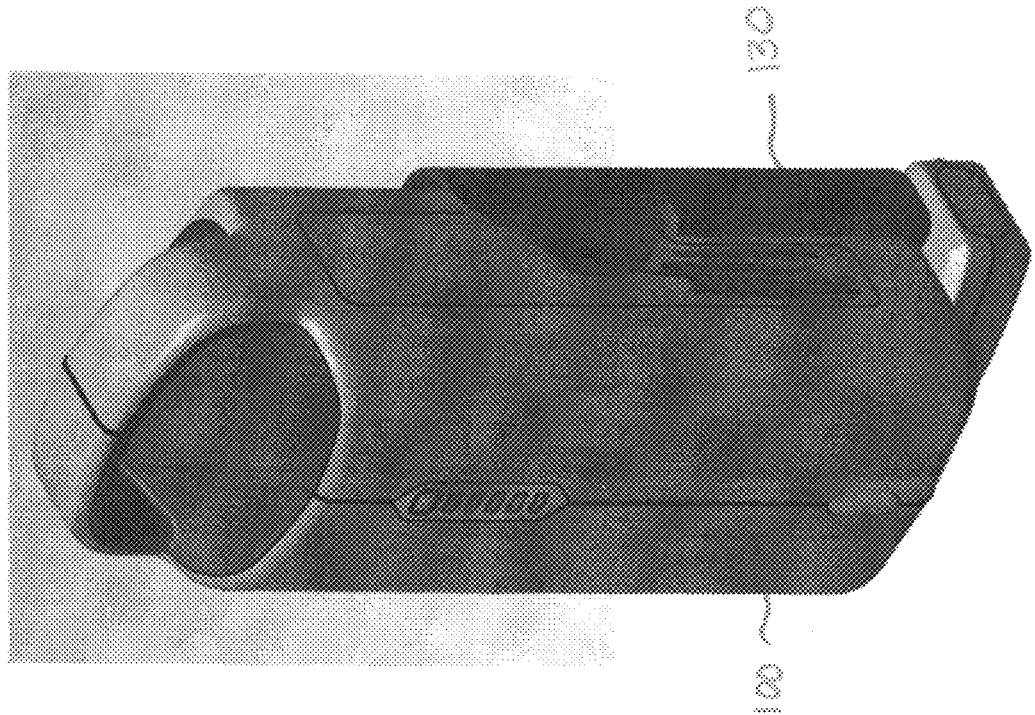
FIG. 4 illustrates an exemplary battery properly coupled to a battery docking connector.
Figure 3:
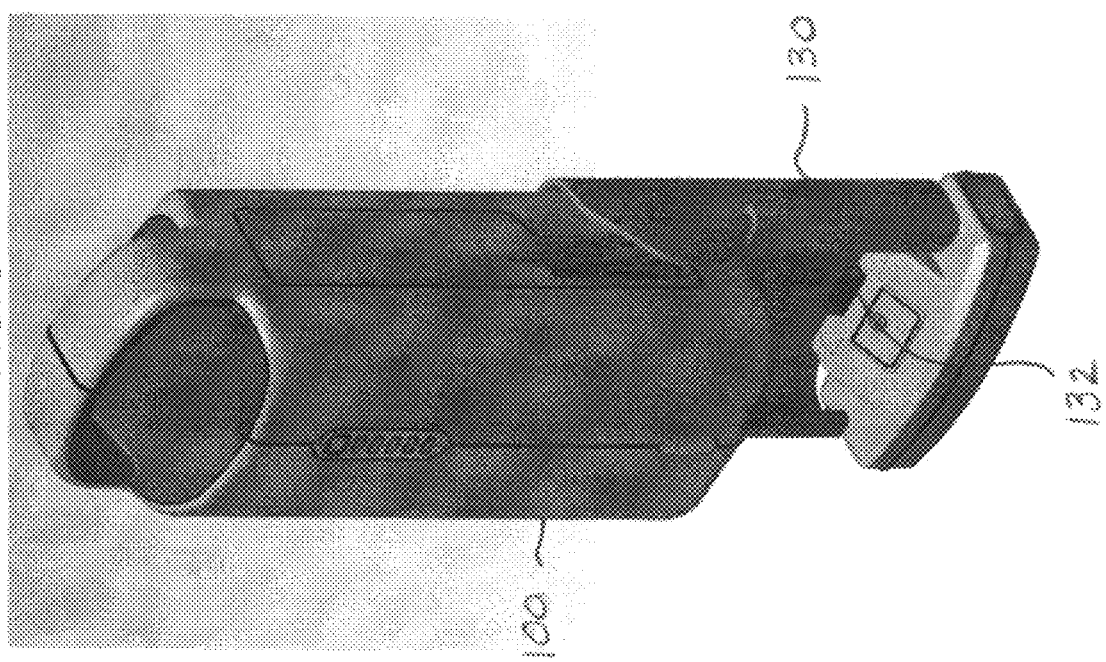
FIG. 3 illustrates an exemplary battery being pushed into proper alignment with a battery docking connector, and approaching contact with exposed battery connection contacts.

FIG. 3 illustrates an exemplary battery 100 being pushed downward into proper alignment with battery docking/connector 130 and approaching contact with exposed battery connection contacts 132. Battery 100 may comprise exposed battery connection contacts (not shown) which are designed to be aligned with exposed battery connection contacts 132 on the battery docking/connector 130. FIG. 4 illustrates an exemplary battery 100 properly coupled to battery docking/connector 130. When the battery 100 is properly coupled to battery docking/connector 130, the battery connection contacts 132 (shown in FIG. 3) on battery docking/connector 130 are no longer visible (as in FIG. 4) and are mechanically and electrically coupled to exposed contacts on battery 100. It should be understood that the battery 100 and battery docking/connector 130 described herein may be any type of battery 100 and/or battery pack and/or battery docking/connector 130 and should not be limited to those shown in the FIGS. herein, which are exemplary only for purposes for illustration, and in some embodiments battery 100 may be coupled to or aligned with a battery docking/connector 130 in a variety of different directions or methods.

If the exposed battery connection contacts 132 become obstructed or damaged, such as by dirt or liquids, they may overheat and eventually destroy the battery 100 and/or the battery docking connector 130 and/or the entire battery connection system. Additionally, if the battery 100 or its exposed contacts 132 are not properly positioned in relation to the battery docking/connector 130 and its exposed battery connection contacts 132, the battery 100 may also overheat and eventually destroy the battery 100 and/or the connection system. It would thus be desirable, to monitor the temperature at the exposed battery connection contacts 132 to prevent overheating and eventual damage to the battery 100 and/or the battery connection system.

Figure 6:
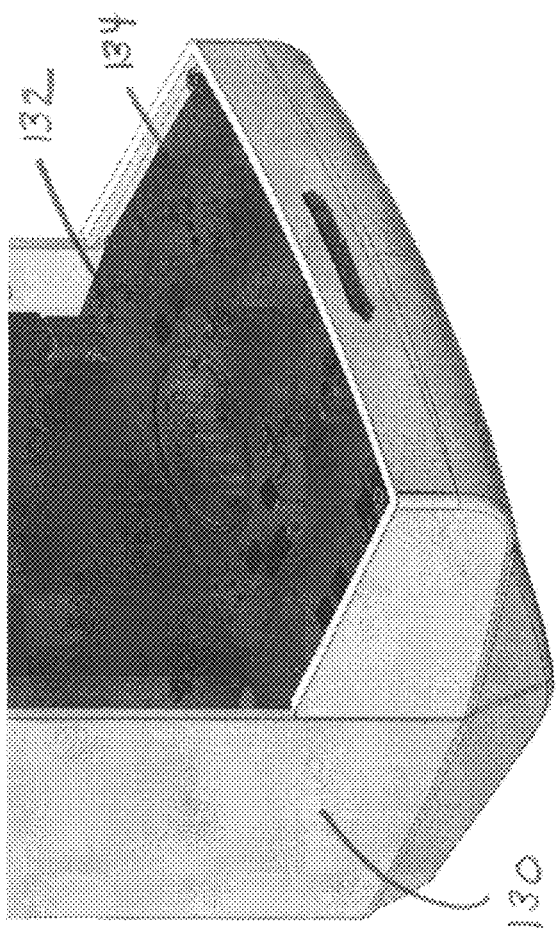
FIGS. 5 and 6 illustrate the exposed battery connection contacts and the underlying printed circuit board of the battery docking connector.
Figure 5:
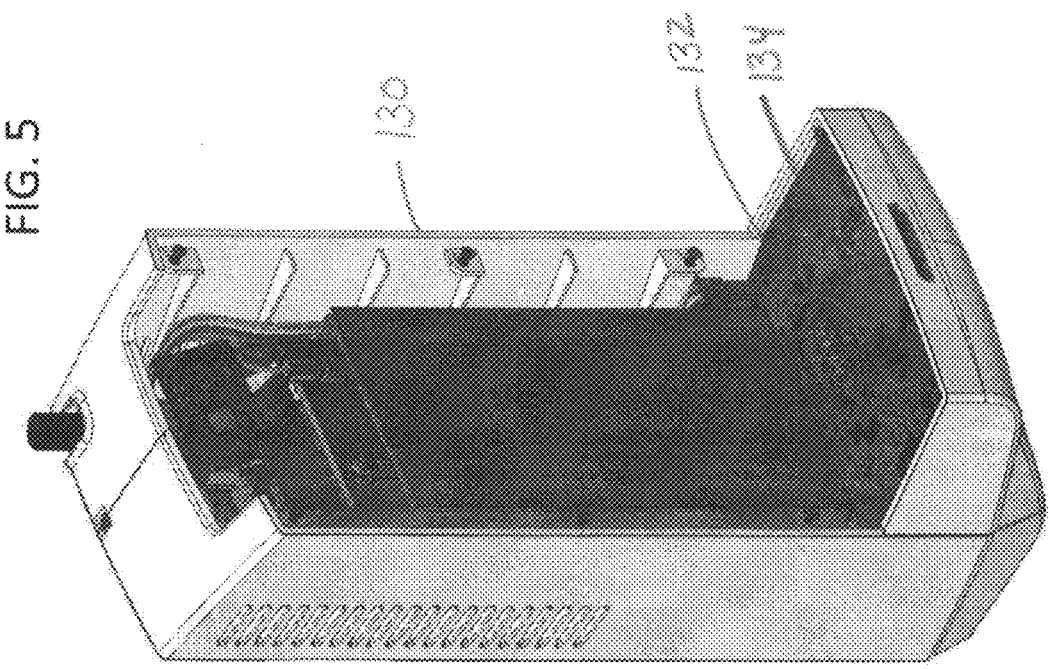

FIGS. 5 and 6 illustrate the battery docking connector 130 having exposed battery connection contacts 132 and the underlying printed circuit board 134 coupled thereto. In one exemplary embodiment, the exposed battery connection contacts 132 may be part of, or electrically coupled to, printed circuit board 134, as shown in FIGS. 5 and 6. It would be desirable, to monitor the temperature of the exposed battery connection contacts 132 on the printed circuit board 134.

In order to monitor the temperature of the exposed battery connection contacts 132, a circuit sensor 136 (shown and circled in FIGS. 7 and 8) may be positioned on the printed circuit board 134 (such as at positions R259, R260, for example) to detect heat and/or monitor the temperature. The circuit sensor 136 may also comprise a thermal sensor, thermocouple, temperature sensor, and/or thermistor.

Figure 8:
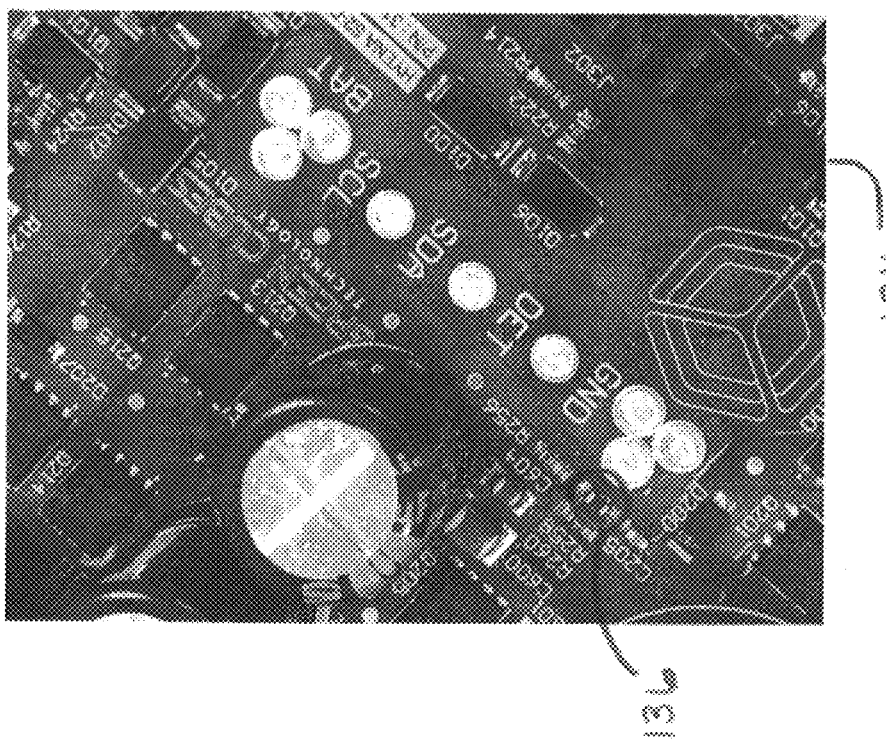
FIGS. 7 and 8 illustrate the circuit sensor positioned on the printed circuit board of the battery docking connector.
Figure 7:
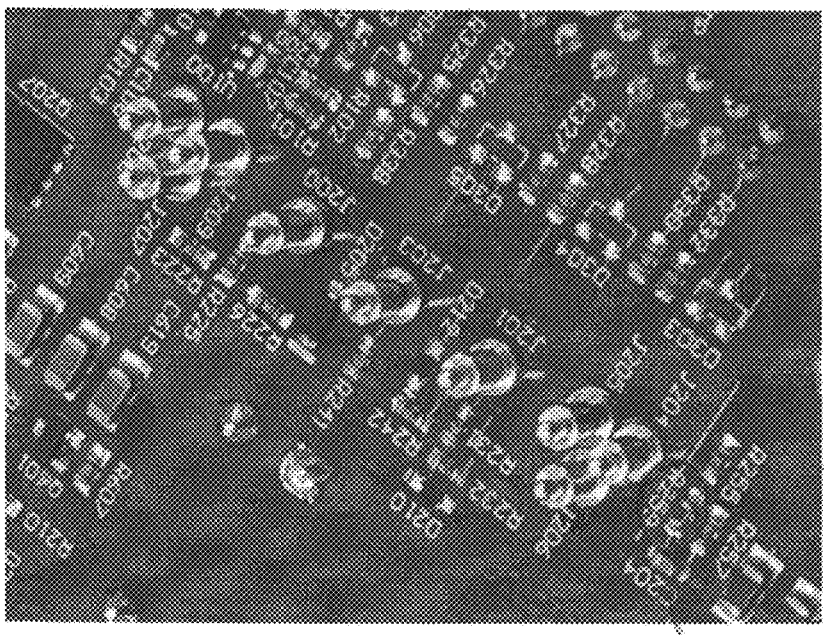

The circuit sensor 136, shown in FIGS. 7 and 8, may sense or detect heat and/or temperature and shut the battery docking connector 130 and/or entire battery connection system down should the temperature rise too high, thus saving the battery 100, battery docking connector 130, and/or the entire system from permanent damage. The circuit sensor 136 may operate by switching off the electrical load to the battery 100 via exposed battery connection contacts 132 once a predetermined threshold temperature has been reached. By switching off the electrical load to the battery 100 and/or exposed battery connection contacts 132, the battery 100 and/or battery docking connector 130 can be turned off before overheating to prevent permanent damage. In this embodiment, a user or operator may be alerted, such as by receiving an error message, that the exposed battery connection contacts 132 need to be cleaned and/or the battery 100 needs to be repositioned before proceeding.

Figure 9:
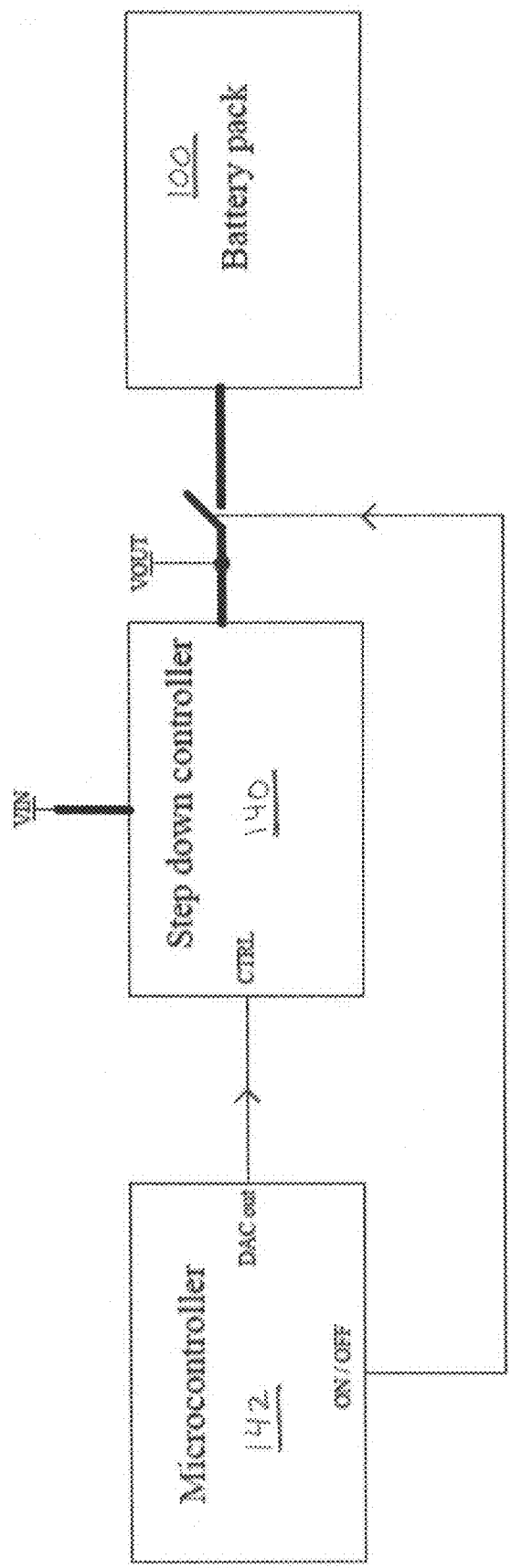
FIG. 9 illustrates the electrical relationship between the microcontroller, step down controller, and battery.

In another embodiment, as shown in FIG. 9, there may be a first predetermined "threshold" temperature to reduce battery current, and a second predetermined "cutoff threshold" temperature to completely cutoff battery current. The predetermined "threshold" and "cutoff threshold" temperatures may be calculated or preset by a user and/or may be altered by a user, such as by changing programming of microcontroller 142. It should also be understood that the predetermined "threshold" and "cutoff threshold" temperatures may vary depending upon the type, size, and number of batteries used and the overall battery usage of a particular system.

As shown in FIG. 9, the step down controller 140 is electrically coupled to both the battery 100 (to charge the battery 100) and to microcontroller 142. In some embodiments, the step down controller 140 may be a DC-DC controller. The battery charger current is set by analog voltage on the CTRL pin of the step down controller 140. The DAC (Digital to Analog Converter) pin of the microcontroller 142 is used to set the analog voltage to control the current to desired value/level. When temperature of the battery (measured at battery pins) crosses the first predetermined "threshold" temperature, then the microcontroller 142 reduces the DAC voltage, which in turn reduces the battery 100 charging current. However, if the temperature continues to rise and the temperature crosses the second predetermined higher "cutoff threshold" temperature, then the microcontroller 142 turns off the current to the battery 100 entirely (to prevent damage by overheating). In another embodiment, during battery 100 charging and/or operation, if the temperature crosses the first predetermined "threshold" temperature, then battery 100 charging current may be reduced, such as by firmware and/or by a step down controller 140 via current reduction to microcontroller 142, for example. If the temperature then rises further and crosses the second predetermined "cutoff threshold" temperature, then the battery 100 charging current may be switched off entirely, such as by the microcontroller 142, for example. In this embodiment, a user or operator may also be alerted, such as by receiving an error or alert message, that the battery 100 needs to be repositioned, or battery connection contacts 132 need to be cleaned, before proceeding.

While various embodiments of devices and systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A battery dock for accepting a battery and switching off an electrical load to the battery to prevent overheating, comprising:
    battery contacts in alignment with battery contacts of the battery wherein the battery contacts of the battery dock and the battery contacts of the battery can be mechanically and electrically coupled in a releasable manner; and
    a circuit sensor electrically coupled to the battery contacts of the battery dock, for sensing the temperature at the battery contacts of the battery dock; and
    wherein the circuit sensor is configured to switch off the electrical load coupled thereto once a threshold temperature has been reached, to prevent overheating of the battery providing power to the electrical load, and wherein a charging current provided to the battery through the battery contacts of the battery dock is reduced when the temperature sensed exceeds a predetermined second threshold temperature.

2. The battery dock of claim 1, wherein the circuit sensor comprises a thermal sensor.

3. The battery dock of claim 1, wherein the circuit sensor comprises a thermistor.

4. The battery dock of claim 1, wherein the circuit sensor comprises a thermocouple.

5. The battery dock of claim 1, wherein the circuit sensor and battery contacts of the battery dock are positioned on a printed circuit board within the battery dock.

6. A method for switching off an electrical load to a battery to prevent overheating, comprising:
    inserting a battery into proper alignment with a battery dock;
    releasably electrically coupling battery contacts of the battery with battery contacts of the battery dock;
    sensing the temperature at the battery contacts on the battery dock; and
    switching off an electrical load at the battery contacts on the battery dock if the temperature sensed exceeds a predetermined threshold temperature, and further comprising the step of reducing a charging current being provided to the battery through the battery contacts of the battery dock when the temperature sensed exceeds a predetermined second threshold temperature.

7. The method of claim 6, wherein sensing the temperature further comprises operating a circuit sensor.

8. The method of claim 7, wherein the circuit sensor and battery contacts of the battery dock are positioned on a printed circuit board positioned within the battery dock.

9. The method of claim 6, further comprising sending an error or alert message to a user regarding the temperature.

* * * * *